United States Patent
Robins

(10) Patent No.: US 6,357,974 B1
(45) Date of Patent: Mar. 19, 2002

(54) QUICK RELEASE DRILL CHUCK

(76) Inventor: Troy L. Robins, 6910 N. Bales, Apt. 312, Gladstone, MO (US) 64119

( * ) Notice: Subject to any disclaimer, the term of this patent is extended or adjusted under 35 U.S.C. 154(b) by 0 days.

(21) Appl. No.: 09/460,834

(22) Filed: Dec. 14, 1999

(51) Int. Cl.7 .............................................. B23B 31/00
(52) U.S. Cl. ...................... 408/240; 279/89; 279/143; 279/158; 403/329
(58) Field of Search ........................... 408/239 R, 240; 279/84, 89, 143, 144, 158; 403/326, 327, 329

(56) References Cited

U.S. PATENT DOCUMENTS

| | | |
|---|---|---|
| 599,783 A | 1/1898 | Hogan |
| 1,403,847 A | 1/1922 | DeArmond |
| 2,258,377 A * | 10/1941 | Collins ........................ 279/144 |
| 2,430,598 A | 11/1947 | Barsam, Jr. |
| 2,507,587 A | 5/1950 | Bjorklund |
| 3,011,794 A | 12/1961 | Vaughn |
| 3,924,493 A | 12/1975 | Penner |
| 3,929,343 A * | 12/1975 | Wanner et al. ................ 279/75 |
| 4,174,648 A | 11/1979 | Wallis |
| 4,508,005 A | 4/1985 | Herman et al. |
| 4,775,269 A * | 10/1988 | Brix ........................ 408/239 R |
| 4,824,298 A * | 4/1989 | Lippacher et al. .......... 408/240 |
| 4,934,717 A | 6/1990 | Budelman et al. |
| 4,953,640 A | 9/1990 | Kurt |
| 5,211,693 A * | 5/1993 | Pacher .................... 408/239 R |
| 5,211,701 A | 5/1993 | Csabafy |
| 5,342,154 A * | 8/1994 | Holzer ........................ 408/240 |
| 5,481,949 A | 1/1996 | Yen |
| 5,911,800 A | 6/1999 | Roberts et al. |
| 5,951,026 A * | 9/1999 | Harmon, Jr. et al. ....... 279/143 |

* cited by examiner

*Primary Examiner*—Steven C. Bishop
(74) *Attorney, Agent, or Firm*—Chase & Yakimo, L.C.

(57) ABSTRACT

A mechanism for engaging a chuck to a chuck body includes a bore within the chuck body having first and second opposed channels in communication therewith. A shaft extending from the chuck is configured for seating in the bore and includes two opposed vanes for seating in the channels. The vanes are depressible allowing for initial bore penetration and seating of the chuck shaft into the bore. Upon seating the vanes are biased into the channels locking the chuck shaft in the bore. A tool provides for depression of the vanes allowing for removal of the seated chuck shaft from the bore. Alternative mechanisms for locking a chuck, chuck body and a driven shaft are disclosed.

19 Claims, 7 Drawing Sheets

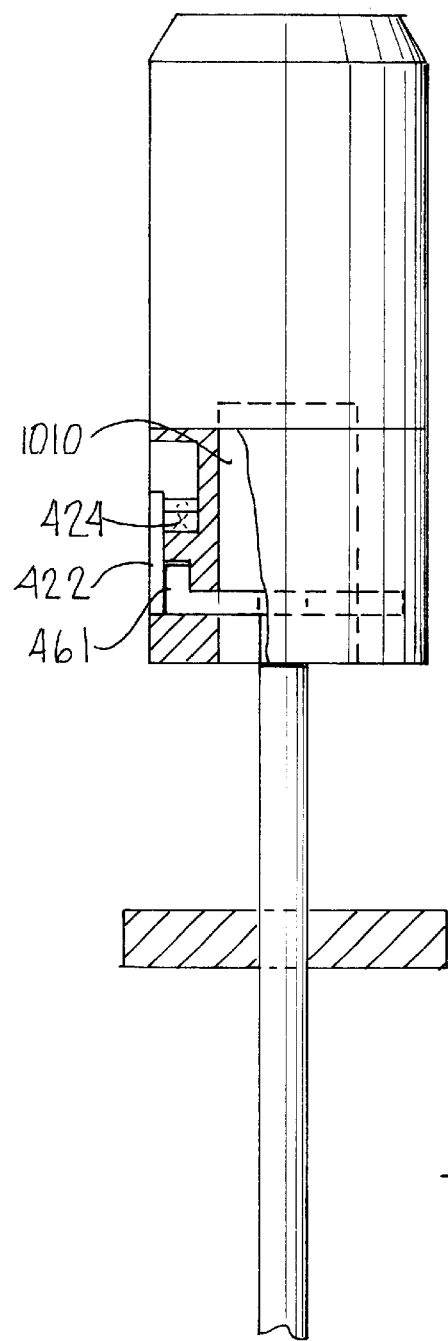

QUICK RELEASE DRILL CHUCK

BACKGROUND OF THE INVENTION

This invention relates generally to rotary tools and, more particularly, to mechanisms for quickly engaging and/or releasing a tool chuck with a chuck body.

Various chucks have been proposed which releasably retain a bit or other tool. More particularly, power tools drive various types of chucks which engage variously sized drill bits and/or other tools therein. In connection therewith I provide various chuck/chuck body mechanisms which enable a chuck to be positively engaged and/or released relative to a drive shaft within the power tool.

SUMMARY OF THE INVENTION

My invention is herein disclosed in the form of four now preferred embodiments which generally utilize a separate or integral chuck body attached to the driven shaft of a power tool, e.g., a drill. In one embodiment I provide a chuck having a shaft adapted for penetration into a chuck body, the shaft having spring-loaded vanes which depress upon penetration into the chuck body and then engage complementary channels within the chuck body. A tool provides for release of the seated vanes for withdrawal of the chuck from the chuck body. In another form of my invention I provide a spring biased slide lock(s) which positions an attached and/or separate locking plate atop the chuck body so as to maintain the seated chuck within the chuck body. In another form of my invention I provide a chuck body/chuck combination having a retaining plate which slidably seats within a slot so as to firmly retain a seated drive shaft. The various forms of my invention allow for an easy engagement and/or release of the chuck relative to the driven shaft of the power tool.

It is therefore a general object of this invention to provide a chuck which is easily engageable with and releasable from a drive shaft of a power tool or the like.

Another object of this invention is to provide a chuck, as aforesaid, having locking vanes on the chuck which nest within complementary channels in the chuck body.

Still another object of this invention is to provide a chuck, as aforesaid, having depressible vanes which seat within complementary channels found within the chuck body.

A still further object of this invention is to provide a chuck, as aforesaid, including a user-manipulated tool to depress the aforesaid vanes from the channels to release the chuck from the chuck body.

Another object of this invention is to provide a retaining plate which clamps a chuck to a chuck body.

Still another object of this invention is to provide clamp assemblies for maintaining the retaining plate in a functional position atop the chuck body for maintaining a seated chuck in a chuck body.

Still a more particular object of this invention is to provide a spring bias in said clamping assemblies which biases the retaining plate away from the chuck body.

Another particular object of this invention is to provide a locking mechanism which utilizes a retaining plate slidable within the chuck body and about a seated chuck shaft.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 16 illustrates a retaining plate for the FIG. 15 embodiment; and

FIG. 17 illustrates the FIG. 15 chuck engaged with a driven shaft and the retaining plate in a locked position.

DESCRIPTION OF THE PREFERRED EMBODIMENT

Figure 1:
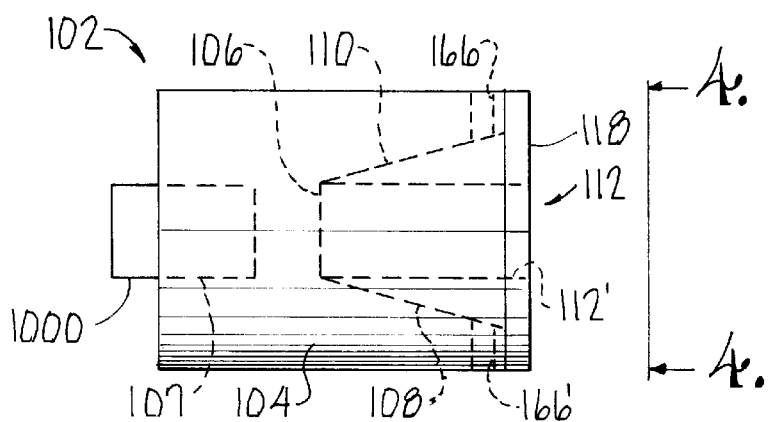
FIG. 1 is a side view of a chuck body with the dotted lines therein respectively showing the seats for the driven shaft and the chuck shaft.
Figure 2:
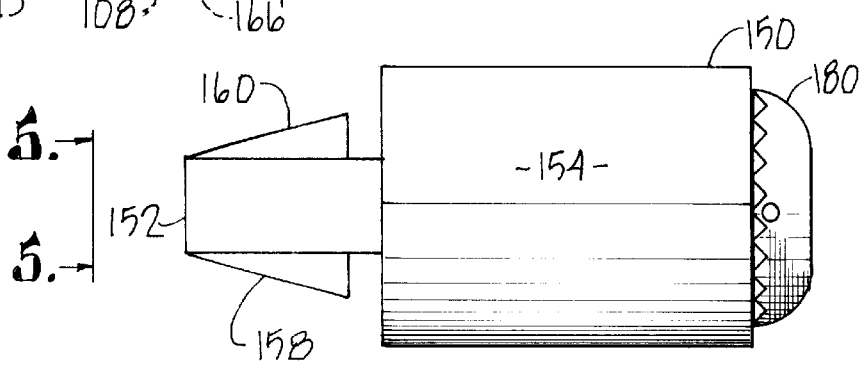
FIG. 2 is a side view showing the chuck prior to penetration into the seat of the chuck body.
Figure 3:
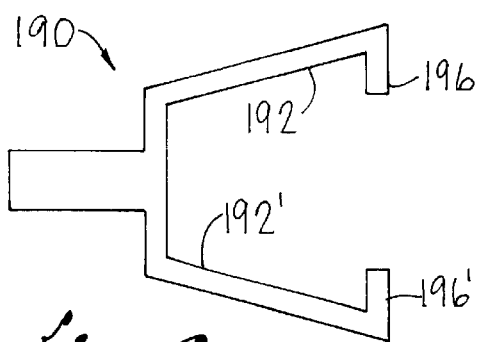
FIG. 3 is a side view of a tool used to release the chuck from the FIG. 1 chuck body.
Figure 4:
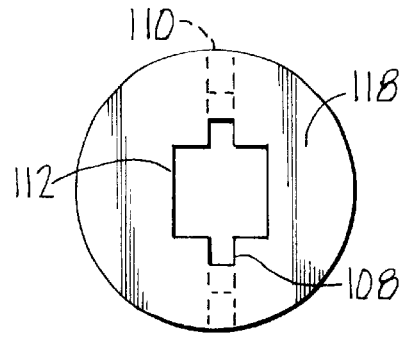
FIG. 4 is an end view of the chuck body.
Figure 5:
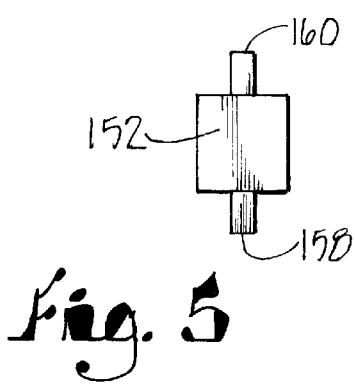
FIG. 5 is an end view of the chuck shaft.

Turning more particularly to the drawings, FIGS. 1–8 show a first embodiment 100 of my invention as comprising a chuck body 102 adapted to be attached to a driven shaft 1000 in any suitable manner. As shown, a bore 107 is provided which presents a seat for the driven shaft 1000. The body 102 comprises a housing 104 having a seat 106 therein in the form of a square-shaped bore 106 with upper and lower vane-shaped channels 108, 110 in communication with bore 106. Bore 106 presents a square-shaped opening 112 at the front face 118 of the chuck body 102 complementary to the shape of chuck shaft 152. The front face 118 closes the access to the channels 108, 110 from outside the chuck body 102.

The chuck assembly 150 generally comprises a chuck housing 154 having a shaft 152 complementary to the shape of bore 106. The chuck shaft 152 has lower and upper springbiased vanes 158, 160 having a configuration adapted to seat within the respective complementary shaped channels 108, 110. The opposed end 180 of chuck 150 receives and maintains the tool/bits therein in a conventional manner.

Figure 6:
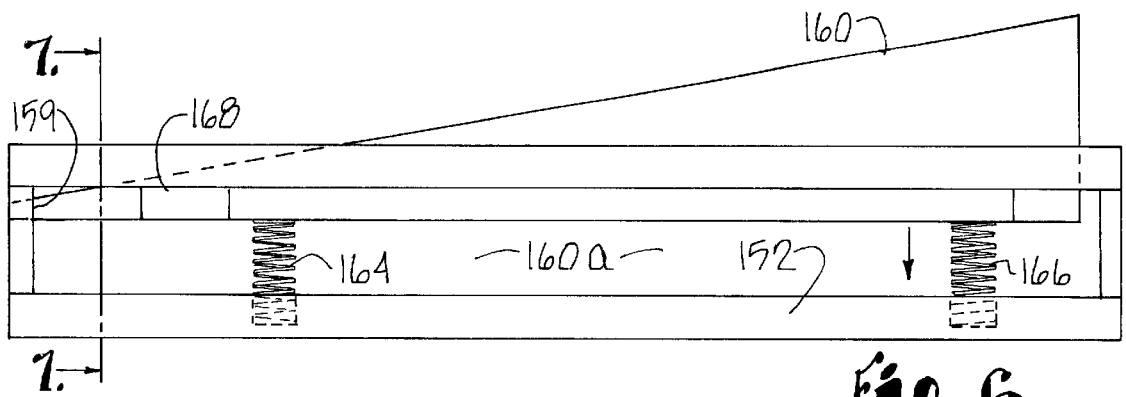
FIG. 6 is an enlarged view showing one depressible vane of the chuck shaft in its raised/locking position.
Figure 7:
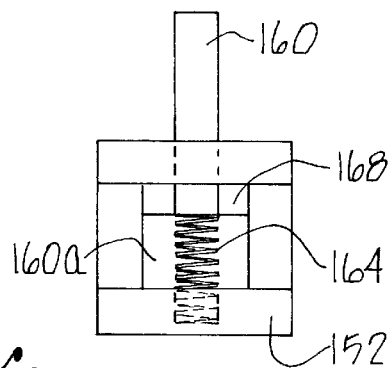
FIG. 7 is an enlarged view of the chuck shaft taken along line 7—7 in FIG. 6.
Figure 8:
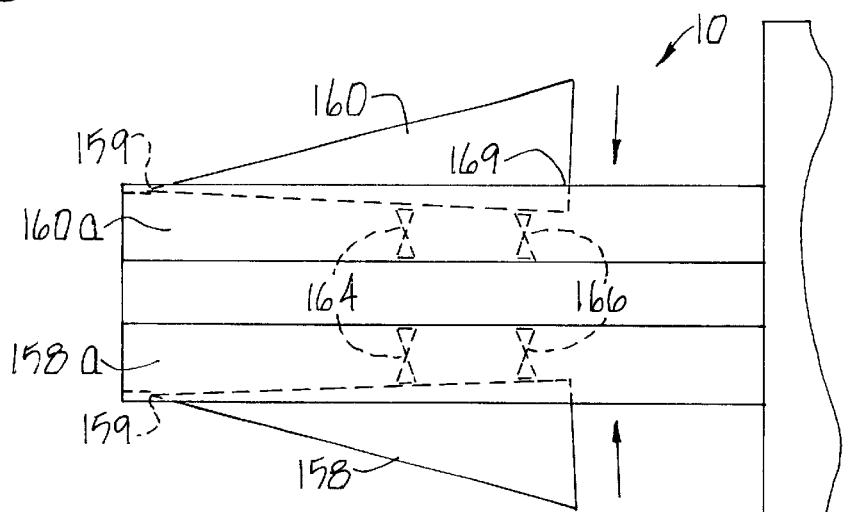
FIG. 8 is an enlarged view of the chuck shaft illustrating the upper and lower vanes.

Shaft 152 includes lower and upper bores 158a, 160a for depression of each respective vane 158, 160 therein upon exertion of pressure on each respective vane 158, 160. One vane 160/bore 160a configuration is as shown in FIG. 6 with both vanes 158, 160 being shown in FIG. 8. Seated within each bore 158a, 160a are springs 164, 166 which bear on the lower edge of each vane so as to urge each vane 158, 160 to a normal position exterior of shaft 152. Each vane 158, 160 is pivotally mounted at an end 159 and is guided in up and down movement by slots 169 and retaining blocks 168. Upon pressure on the top edges of vanes 158, 160, the vanes are pivoted towards the respective bores of shaft 152. The springs 164, 166 are thus compressed so as to urge the depressed vanes 158, 160 to positions outside the shaft 152.

To connect chuck 150 to chuck body 102 shaft 152 is urged through the opening 112 for seating in the bore 106 of the chuck body 102. During this shaft 152 penetration, the edges of the opening 112 bear upon the vanes 158, 160 causing their above-described depression within the confines of the shaft 152. Upon full seating of the shaft 152 within bore 106 the interior vane channels 108, 110 the spring bias 164, 166 urges the vanes 158, 160 therein. At this position chuck 150 is secured within chuck body 102 as vanes 158, 160 are within the respective wing channels 108, 110.

To release the chuck 150 from body 102 tool 190 (FIG. 3) is utilized. Tool 190 includes two flexible arms 192, 192' having flanges 196, 196' therein. Flanges 196, 196' are adapted to fit in the bores 166, 166' of the chuck body 102. Each respective bore 166, 166' communicates with a respective vane channel 108, 110. The user-manipulated flanges 196, 196' are inserted into the bores 166, 166' to exert pressure against each vane 158, 160 and depress the vanes towards the confines of shaft 152. At this depressed position the vanes 158, 160 unseat from the respective channels 108, 110 which allows for withdrawal of shaft 152 from bore 106. This action releases chuck 150 from the chuck body 102. Upon removal of shaft 152 from bore 106 the biased vanes 158, 160 return to their normal FIG. 8 position exterior of the shaft 152.

Figure 9:
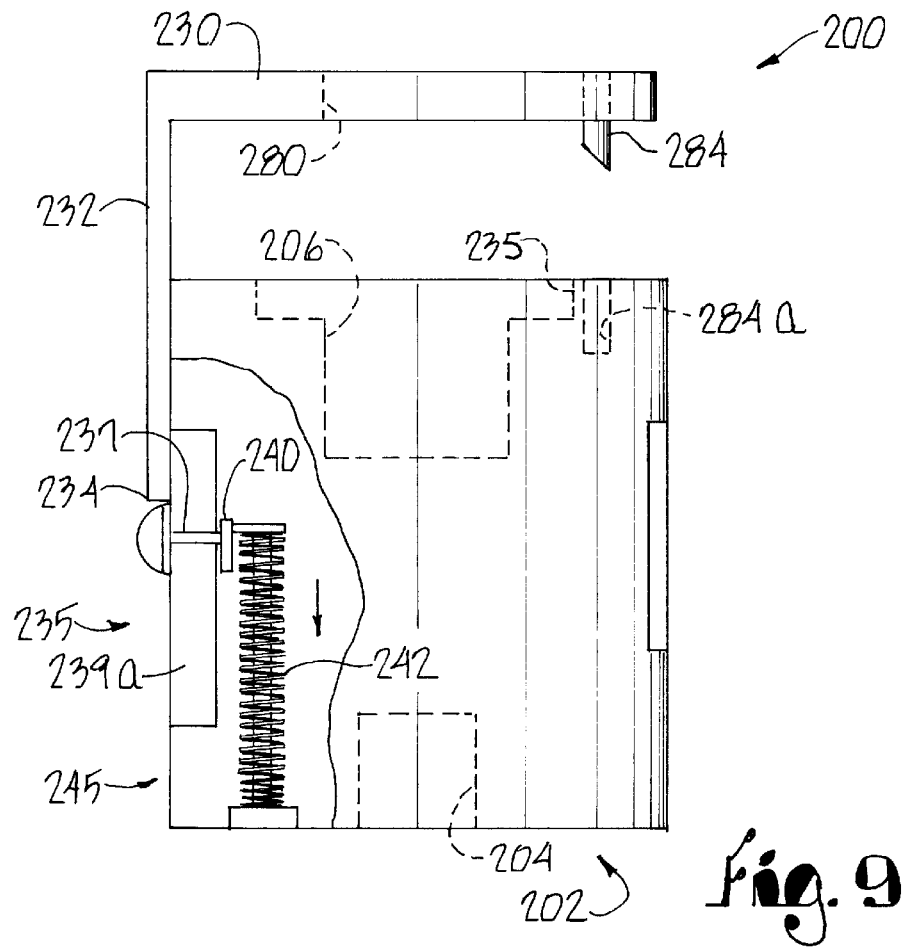
FIG. 9 illustrates a second embodiment of a chuck body of my invention with a portion broken away to show the mechanism for the clamping assembly/retainer plate combination.
Figure 10:
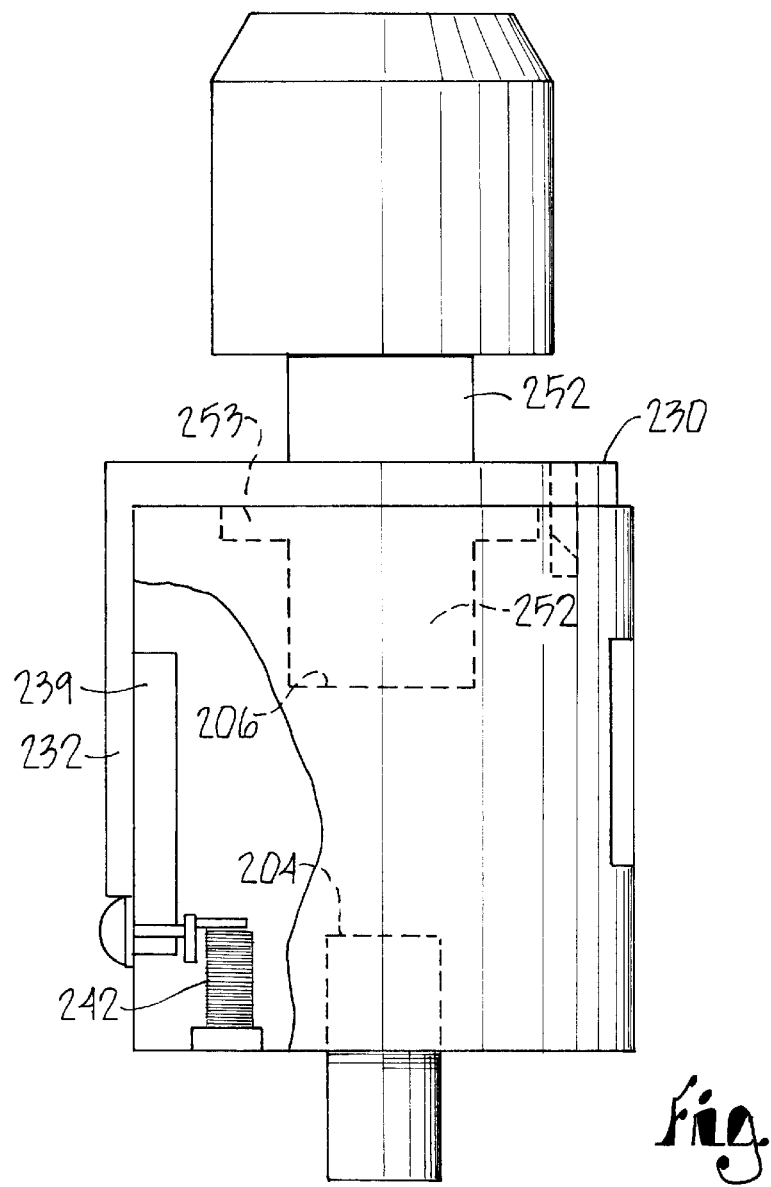
FIG. 10 illustrates a chuck seated in the chuck body of FIG. 11 with a portion of the housing broken away to show the clamping mechanism in a diagrammatic locking mode.

My second embodiment 200 is as shown in FIGS. 9–10. Embodiment 200 presents a chuck body 202 having a threaded aperture 204 adapted to fit about the end of a driven shaft. At the opposed end of the body 202 is a bore 206 configured to receive a complementary configured shaft 252 of the chuck body 202 (FIG. 10).

Figure 11:
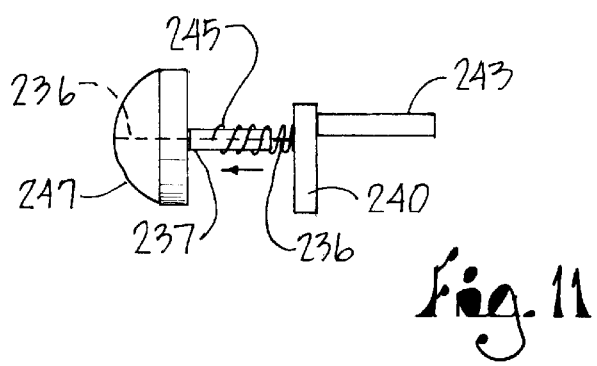
FIG. 11 diagrammatically illustrates the latch at the end of the arm of the FIG. 10 clamp assembly.

A clamping assembly includes a retaining plate 230 for overlying the bore 206 opening 235 in the housing. Plate 230 is movable by a slidable arm 232. At one end 234 of arm is attached a spring-biased stem assembly which includes arm 236 extending into a slot 238 on the exterior of the housing. Arm 236 is positioned within a sleeve 237 with ends of a spring 245 respectively connected thereto. Thus, spring 242 urges arm 236 to the left as viewed in FIG. 11. Within the slot 238 are first and second spaced-apart rails 239. One rail, which is shown for purposes of illustration, is located within the body. The arm 236 includes a flared end 240 which slides along the edges of the spaced-apart rails 239. The flared end 240 prevents lateral withdrawal of the arm 236 from between the rails. The free end 243 of arm 236 is connected to a spring 246 within the housing 202 such that downward movement of arm 232 compresses spring 242.

Figure 9A:
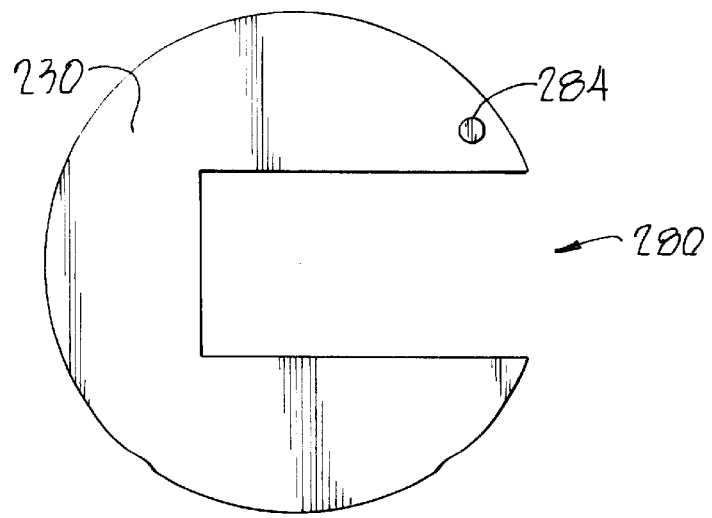
FIG. 9a is an end view, on a reduced scale, of the retaining plate.

Within the retaining plate 230 is a slot 280 (FIG. 9a) which slidably receives the reduced position 254 of shaft 252 relative to the collar 253. The plate 230 includes at least one pin 284 which seats in an aperture 284a within the face of chuck body 202. The configuration of slot 280 precludes the enlarged collar 253 of shaft 252 from passing through the slot 232 in plate 230.

During downward slidable movement, the flared end 240 travels beyond the lower ends of the spaced-apart rails 239. At this point spring 245 urges the flared end 240 of arm 236 underneath the rails 239, 239a which precludes movement of the flared end 240 as biased by the compressed spring 242. Plate 230 is thus maintained in a FIG. 10 locking position atop the face of the chuck body to retain the seated shaft 252 within bore 206.

To release the plate 230 the exterior end of arm 236 is pressed at 247 which moves the flared end 240 from its position underneath the rails 239 and into the FIG. 9 slidable position along the rails 239. The compressed spring 242 expands which moves the flared end 240, arm 232 and retaining plate 230 to an upward/released FIG. 9 position. Thus, removal of the seated chuck shaft 252 from bore 206 is possible.

Figure 12:
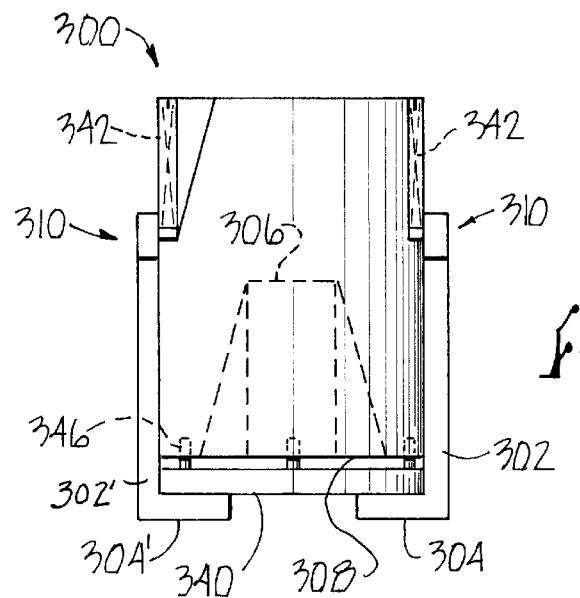
FIG. 12 shows a third embodiment of my invention showing a chuck body with two slidable clamping assemblies and a separate retainer plate.
Figure 13:
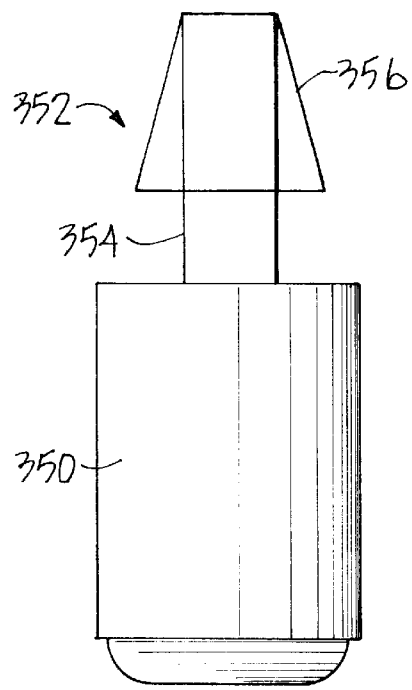
FIG. 13 is a side view of one form a chuck for insertion into the chuck body of FIG. 12.
Figure 14:
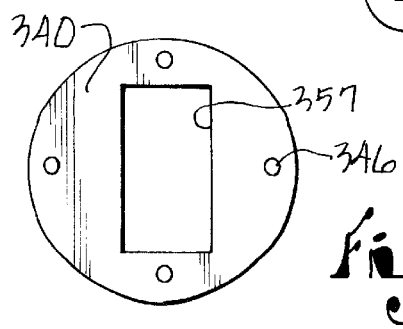
FIG. 14 is a top view of a retaining plate for the device of FIG. 11.

My third embodiment 300 is as shown in FIGS. 12–14. This embodiment 300 utilizes a pair of clamping assemblies as above described. However, the retaining plate 340 is not connected to the slidable arms 302, 302'. Each clamping assembly 310 works in a manner similar to the assembly described in FIG. 9. After the seating of the chuck shaft (FIG. 13) in bore 306 the retaining plate 340 is initially aligned atop the front face of chuck body 300 by means of registering a plurality of pins 346 on plate 340 with apertures 344 in the face 308 of the chuck body.

The chuck body includes a bore 306 designed to receive a similar configured shaft portion 356 extending from the chuck 350. Shaft 352 is configured to have an enlarged portion 356 and reduced portion 354. The portion 356 is configured for extension through orifice 357 in plate 340 only upon a proper orientation of shaft 352 relative to orifice 342. Upon alignment of plate 340 atop the chuck body by the above-described pin 346 registration the relative orientation of the plate 340 aperture 347 with the seated shaft portion 356 precludes passage of the shaft portion 356 through the plate 340 orifice. In this portion the slidable arms 302, 302' are pressed to cause flanges 304, 304' of arm 302, 302' to clamp plate 340 atop the chuck face. The arms 302, 302' are retained in the locked position and released therefrom as above described in embodiment 200. The compressed springs 342, 342' expand which slides the respective arms 302 and flanges 304 away from plate 340 allowing for its removal from the chuck body face.

Figure 15:
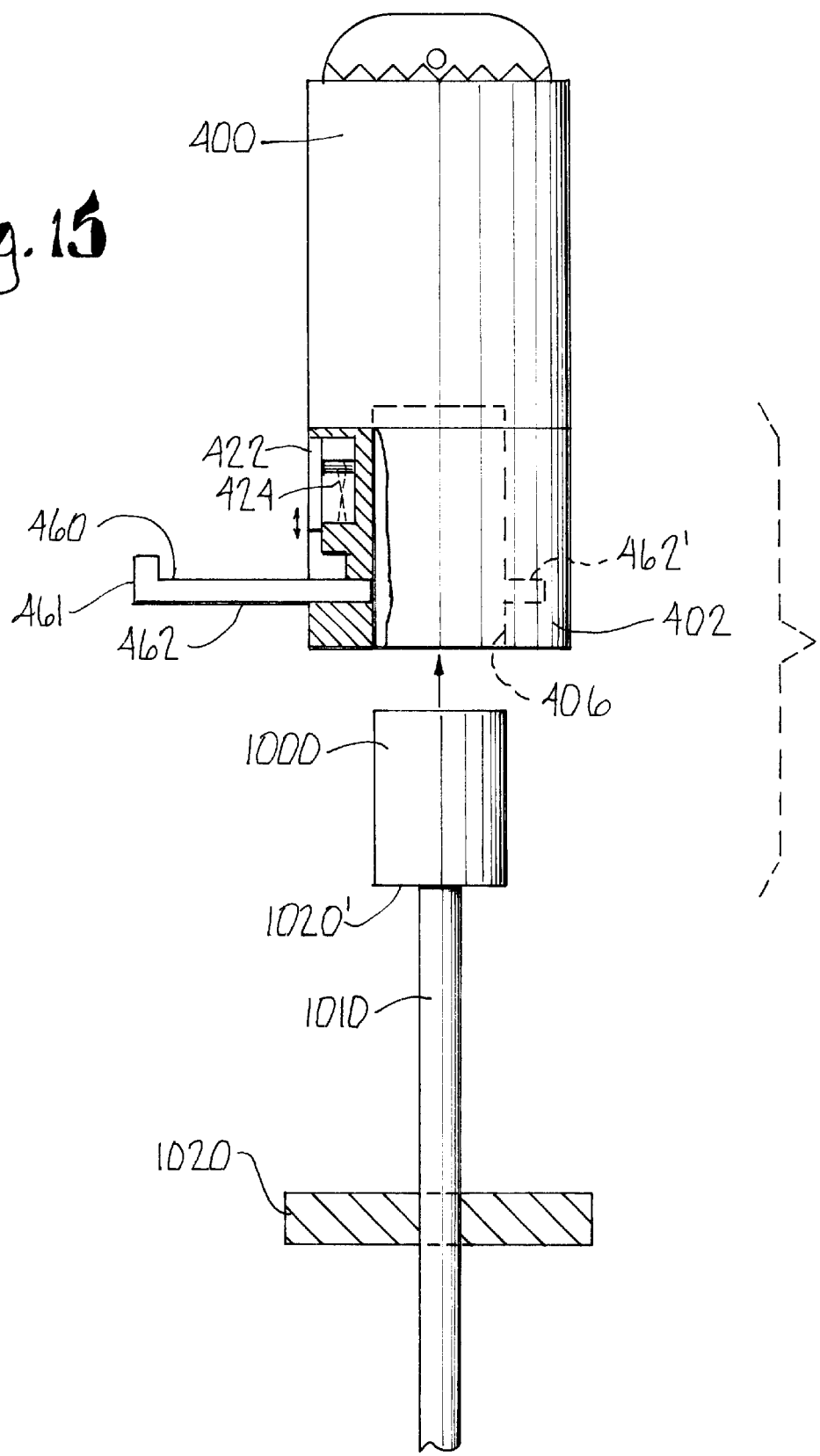
FIG. 15 illustrates a fourth embodiment of my invention showing a combined chuck/chuck body with the retaining plate partially displaced from a seated position and the driven shaft displaced from the shaft seat.

A fourth embodiment of my invention is as shown in FIGS. 15–17 which combines the chuck body 402 and chuck 400. Therein the gear 1020 drive shaft 1000 seats in a bore 406 at one end of the chuck body 402. A retaining plate 460 is slidable into a slot 462' which traverses the bore 406. The plate 460 has a slot 464 therein which receives the reduced portion 1010 of shaft 1000 therein. The shoulder 1020' of shaft 1000 is larger than slot 464 which precludes withdrawal of shaft from bore 406 when plate 460 is in slot 462' as the relatively greater collar 1020' of the seated shaft 1000 cannot pass through slot 464.

Plate 460 is held in place by a spring 424 biased slidable latch 422 which urges latch towards its FIG. 17 position so as to overlie the end 461 of seated plate 460. To remove the plate 460 the user overcomes the spring bias by manually sliding the latch 422 to the FIG. 15 position allowing for removal of plate 460 from slot 462.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A chuck/chuck body combination device for attachment to a driven shaft comprising:

a chuck body having first and second ends;

means at said chuck body first end adapted for engaging an end of a driven shaft therein;

a fist bore in said chuck body adapted to receive a shaft extending from a chuck therein;

at least one channel in said chuck body and in communication with said first bore;

a chuck having first and second ends, said chuck having means at said first end adapted for releasable engaging a tool therein;

a shaft extending from said chuck second end, said chuck shaft configured to seat within said first bore in said chuck body;

at least one vane on said chuck shaft, each vane adapted to nest within a respective said at least one channel upon insertion of said chuck shaft into said first bore, whereby to engage said chuck with said chuck body.

2. The device as claimed in claim 1 wherein said at least one vane comprises means for positioning said at least one vane at a first position exterior of said chuck shaft for said nesting within said respective at least one channel and a second position for positioning said at least one vane within said chuck shaft upon an initial penetration of said chuck shaft into said first bore in said chuck body.

3. The device as claimed in claim 2 further comprising bias means in said chuck shaft for biasing said at least one vane towards said first position.

4. The device as claimed in claim 2 further comprising means for urging said at least one vane nested within said respective at least one channel from said first position to said second position whereby to allow withdrawal of said chuck shaft from said first bore in said chuck body.

5. The device as claimed in claim 4 wherein said urging means comprises:

a second bore in said chuck body extending from an exterior of said chuck body and to said at least one respective channel;

a user operable tool for insertion into said second bore, an end of said tool bearing against said at least one nested vane in said respective at least one channel to move said vane from said first to said second position, whereby to allow withdrawal of said chuck shaft from said first bore in said chuck body.

6. A chuck/chuck body mechanism for attachment to a driven shaft comprising:

a chuck body having first and second ends;

means at said first end of said chuck body adapted for engaging an end of a driven shaft therein;

a bore in said chuck body adapted to receive a shaft extending from a chuck therein, said bore presenting an opening at said chuck body first end;

a chuck having a first end having means adapted for releasably engaging a tool therein;

a shaft extending from a second end of said chuck, said chuck shaft configured to seat within said bore in said chuck body;

a clamp assembly for maintaining said chuck shaft within said chuck body bore, said clamp assembly comprising:

a retaining plate for extension of said seated chuck shaft therethrough while overlying said bore opening in said chuck body;

an arm attached to said retaining plate;

means for moving said arm along said chuck body between a first position at which said retaining plate is displaced from said bore opening for insertion and/or removal of said chuck shaft into said chuck body bore and a second position in which said retaining plate closes said bore opening to retain said seated chuck shaft in said chuck body bore;

means for maintaining said plate at said second position, whereby to engage said chuck with said chuck body.

7. The mechanism as claimed in claim 6 wherein said moving means comprises:

a slot in said chuck body;

a stem extending from said arm and into said chuck body slot;

means in said slot for providing a course of movement for said stem between said first and second ends of said chuck body, a movement of said stem along said course to said second chuck body end moving said retaining plate to said second retaining plate position, an opposed movement of said stem along said course to said first chuck body end moving said retaining plate to said first retaining plate position, said maintaining means maintaining said stem at a position along said course corresponding to said second retaining plate position.

8. The mechanism as claimed in claim 7 wherein said course means comprises a pair of spaced-apart rails in said slot with said stem extending therebetween, a portion of said stem in a position for slidable movement along said rails.

9. The mechanism as claimed in claim 8 wherein said maintaining means comprises means for displacing said slidable portion of said stem from said slidable movement position on said rails to preclude said slidable movement of said stem portion along said rails.

10. The mechanism as claimed in claim 9 wherein said displacing means includes user operable means for urging said stem portion from said displaced position relative to said rails to said position for said slidable movement therealong.

11. The mechanism as claimed in claim 6 further comprising:

at least one aperture in said chuck body adjacent said opening;

a corresponding at least one pin extending from said retaining plate for registration with said at least one aperture at said second retaining plate position, whereby to properly align said retaining plate with said chuck body at said second position.

12. A chuck/chuck body mechanism for attachment to a driven shaft comprising:

a chuck body having first and second ends;

means at said first end of said chuck body adapted for engaging an end of a driven shaft therein;

a bore in said chuck body adapted to receive a shaft extending from a chuck therein, said bore presenting an opening at said chuck body first end;

a chuck having a first end having means adapted for releasably engaging a tool therein;

a shaft extending from a second end of said chuck, said chuck shaft configured to seat with said bore in said chuck body;

a retaining plate for extension of said chuck shaft therethrough while in a position closing said bore opening in said chuck body;

at least one clamp assembly for maintaining said retaining plate in said position closing said bore opening in said chuck body, said at least one clamp assembly comprising:

an arm including a flange for overlying said retaining plate;

means for moving said arm along said chuck body between a first position at which said flange is displaced from said retaining plate thereon to allow removal of said retaining plate from said chuck body and a second position at which said flange bears against said retaining plate while in said position closing said opening, whereby to maintain said plate at said closing position to engage said chuck body with said chuck.

13. The mechanism as claimed in claim 12 wherein said moving means comprises:

a slot in said chuck body;

a stem extending from said arm and into said chuck body slot;

means in said slot for providing a course of movement for said stem between said first and second ends of said chuck body, a movement of said stem along said course to said second end moving said arm and flange to said position bearing against said retaining plate, a movement of said stem along said course to said first end moving said arm and flange to a position displaced from said retaining plate whereby to remove said retaining plate from said chuck body.

14. The mechanism as claimed in claim 13 further comprising means for maintaining said flange at said position bearing against said retaining plate.

15. The mechanism as claimed in claim 13 wherein said course means comprises a pair of spaced-apart rails in said slot with said stem extending therethrough, an end of said stem positioned in sliding movement along said rails.

16. The mechanism as claimed in claim 15 further comprising means for displacing said stem end from said sliding position along said rails upon said flange bearing against said retaining plate.

17. The mechanism as claimed in claim 13 further comprising:

at least one aperture in said chuck body;

a corresponding at least one pin extending from said retaining plate and into said at least one aperture at said position closing said bore, whereby to align said retaining plate at a desired position with said chuck body.

18. A mechanism for attaching a chuck to a driven shaft comprising:

a chuck having first and second ends;

a bore in said chuck first end adapted to seat an end of a driven shaft therein;

means at said chuck second end adapted for releasably engaging a tool therein;

a slot extending through said chuck and across said bore;

a retaining plate for insertion into said slot, said plate configured to traverse said chuck bore after a seating of the driven shaft therein, said plate in said slot precluding withdrawal of the seated driven shaft from said bore;

a slot in said plate, said plate slot having a configuration relative to a configuration of the seated shaft to preclude movement of the seated shaft from said bore and through said plate;

means for maintaining said retaining plate in said slot to maintain the driven shaft in said chuck bore.

19. The mechanism as claimed in claim 18 wherein said maintaining means comprises:

a latch in said chuck;

means for urging said latch to a position relative to said plate to preclude movement of said retaining plate from said slot.

* * * * *